US010710424B2

(12) United States Patent
Eckert et al.

(10) Patent No.: US 10,710,424 B2
(45) Date of Patent: Jul. 14, 2020

(54) HVAC UNIT PLACEMENT CONFIGURATION FOR A VEHICLE

(71) Applicant: BYTON LIMITED, Hong Kong (HK)

(72) Inventors: Christopher Eckert, San Jose, CA (US); Shawn Slovesko, Santa Clara, CA (US)

(73) Assignee: BYTON LIMITED, Hong Kong (HK)

( * ) Notice: Subject to any disclaimer, the term of this patent is extended or adjusted under 35 U.S.C. 154(b) by 26 days.

(21) Appl. No.: 15/863,834

(22) Filed: Jan. 5, 2018

(65) Prior Publication Data
US 2019/0210422 A1    Jul. 11, 2019

(51) Int. Cl.
*B60J 7/00*    (2006.01)
*B60H 1/00*    (2006.01)
(Continued)

(52) U.S. Cl.
CPC ..... *B60H 1/00207* (2013.01); *B60H 1/00392* (2013.01); *B60H 1/00428* (2013.01);
(Continued)

(58) Field of Classification Search
CPC ...... B60P 3/32; Y10S 280/901; B60R 21/233; B60F 3/0053; B60H 1/00371;
(Continued)

(56) References Cited

U.S. PATENT DOCUMENTS 4,216,839 A * 8/1980 Gould .................. B60K 1/04
104/34
4,307,575 A * 12/1981 Frosch ................ B60H 1/3201
62/148
(Continued)

FOREIGN PATENT DOCUMENTS

DE    102009057870 A1    6/2011
DE    102011115170 A1    4/2012
(Continued)

OTHER PUBLICATIONS

MEtv Product Reviews: "Tesla Model X vs. Model S—Front Trunk: (Frunk) Compared ", Sep. 7, 2016 (Sep. 7, 2016), 1 page, XP054979267, Retrieved from the Internet: URL: https://www.youtube.com/watch?v=MycXpTrNa5g; [retrieved on Feb. 3, 2019].
(Continued)

*Primary Examiner* — Kiran B Patel
(74) *Attorney, Agent, or Firm* — Womble Bond Dickinson (US) LLP

(57) ABSTRACT

Embodiments and examples are disclosed for placement configurations of HVAC units for electric vehicles. For one embodiment, a vehicle includes a front compartment, a cabin compartment, a vehicle body, and a HVAC unit. The front compartment is at a front end of the vehicle. The cabin compartment is at a center of the vehicle to contain passengers. The body of the vehicle contains a dashwall separating the front compartment from the cabin compartment. The heat ventilation air conditioning (HVAC) unit is situated in the front compartment, separated from the cabin compartment by the dashwall, where the HVAC unit provides heat, ventilation, and air conditioning to the user in the cabin compartment.

11 Claims, 3 Drawing Sheets

(51) Int. Cl.
*B60K 1/02* (2006.01)
*B60L 50/60* (2019.01)
*B60K 1/04* (2019.01)
*B62D 25/08* (2006.01)
*B62D 25/14* (2006.01)

(52) U.S. Cl.
CPC .............. *B60K 1/02* (2013.01); *B60K 1/04* (2013.01); *B60L 50/66* (2019.02); *B62D 25/082* (2013.01); *B62D 25/087* (2013.01); *B62D 25/142* (2013.01); *B60H 2001/00214* (2013.01); *B60K 2001/0438* (2013.01); *B60Y 2200/91* (2013.01)

(58) Field of Classification Search
CPC ............. B60H 1/00378; B60H 1/004; B60H 1/00478; B60H 1/00428; Y02T 10/88
See application file for complete search history.

(56) References Cited

U.S. PATENT DOCUMENTS

| | | | | |
|---|---|---|---|---|
| 5,341,652 A * | 8/1994 | Tajiri | ............... | B60H 1/0005 165/42 |
| 5,562,538 A * | 10/1996 | Suyama | ............ | B60H 1/00392 165/267 |
| 7,921,945 B2 * | 4/2011 | Harris | .................... | B60K 6/48 180/65.1 |
| 8,839,632 B2 * | 9/2014 | Goenka | ................... | B60N 2/56 62/244 |
| 9,109,840 B2 * | 8/2015 | Kadle | ................ | B60H 1/00899 |
| 9,682,607 B2 * | 6/2017 | Han | .................. | B60H 1/00335 |
| 9,919,576 B2 * | 3/2018 | Kim | .................. | B60H 1/0005 |
| 2007/0186573 A1 * | 8/2007 | Ziehr | ................... | B60H 1/004 62/236 |
| 2008/0139102 A1 * | 6/2008 | Major | ............... | B60H 1/00278 454/139 |
| 2009/0071178 A1 * | 3/2009 | Major | ............... | B60H 1/00278 62/239 |
| 2010/0187211 A1 * | 7/2010 | Eisenhour | .......... | B60H 1/00742 219/202 |
| 2011/0162901 A1 * | 7/2011 | Lucas | ............... | B60H 1/00278 180/68.2 |
| 2011/0165830 A1 * | 7/2011 | Smith | ............... | B60H 1/00278 454/75 |
| 2011/0284298 A1 | 11/2011 | Ajisaka et al. | | |
| 2012/0003516 A1 * | 1/2012 | Eisenhour | .......... | H01M 10/625 429/62 |
| 2012/0009859 A1 * | 1/2012 | Wijaya | ............... | B60H 1/00764 454/75 |
| 2012/0079836 A1 * | 4/2012 | Oh | .................... | B60H 1/00428 62/3.3 |
| 2012/0102973 A1 * | 5/2012 | Oh | .................... | B60H 1/00028 62/3.61 |
| 2012/0234518 A1 * | 9/2012 | Brodie | ............... | B60H 1/00278 165/104.31 |
| 2012/0266608 A1 * | 10/2012 | Kadle | .................... | F25B 21/02 62/3.2 |
| 2013/0127475 A1 * | 5/2013 | Sitarski | ............... | B60L 11/1868 324/435 |
| 2013/0234651 A1 * | 9/2013 | Buford | .................... | B60L 1/003 320/107 |
| 2013/0264325 A1 * | 10/2013 | Nemesh | .................... | B60L 1/02 219/202 |
| 2014/0026600 A1 * | 1/2014 | Wippler | ............. | B60H 1/00785 62/80 |
| 2014/0060795 A1 * | 3/2014 | Yu | ...................... | B60H 1/00821 165/202 |
| 2014/0083672 A1 * | 3/2014 | Rollinson | .......... | B60H 1/00764 165/202 |
| 2015/0096816 A1 * | 4/2015 | Pham | .................. | B60H 1/00278 180/68.2 |
| 2016/0001748 A1 * | 1/2016 | Moskowitz | .............. | B60K 1/04 701/22 |
| 2016/0332502 A1 * | 11/2016 | Rollinson | .......... | B60H 1/00742 |
| 2016/0355068 A1 * | 12/2016 | Sutherland | ......... | B60H 1/00392 |
| 2017/0008369 A1 * | 1/2017 | Kim | .................... | B60N 2/5628 |
| 2017/0054188 A1 * | 2/2017 | Blatchley | ............ | H01M 10/663 |
| 2017/0056806 A1 * | 3/2017 | Mardall | .................. | B01D 46/42 |
| 2017/0072966 A1 * | 3/2017 | Bolger | ............. | B60W 50/0098 |
| 2017/0136842 A1 * | 5/2017 | Anderson | ............. | B60G 17/016 |
| 2017/0203637 A1 * | 7/2017 | Berkson | ................ | B60H 1/3222 |
| 2017/0210203 A1 * | 7/2017 | Quix | .................... | B60H 1/00314 |
| 2018/0015953 A1 | 1/2018 | Ajisaka et al. | | |
| 2018/0022387 A1 * | 1/2018 | Ta | ............................ | B60K 1/00 180/291 |
| 2018/0057012 A1 * | 3/2018 | Delgado | ............... | E05F 15/695 |
| 2018/0086224 A1 * | 3/2018 | King | .................. | B60L 11/1874 |
| 2018/0118174 A1 * | 5/2018 | Moskowitz | ......... | B60L 11/1877 |
| 2018/0162190 A1 * | 6/2018 | Hensler | ................ | B60H 1/0005 |
| 2018/0162447 A1 * | 6/2018 | Fees | ........................ | B60K 1/00 |
| 2018/0186274 A1 * | 7/2018 | Gurin | ...................... | B60P 3/423 |
| 2018/0194361 A1 * | 7/2018 | Dudar | ............... | B60W 50/0098 |
| 2018/0208017 A1 * | 7/2018 | Hernandez | ......... | B60H 1/00985 |
| 2018/0218470 A1 * | 8/2018 | Belwafa | ................ | G06Q 10/02 |
| 2018/0272936 A1 * | 9/2018 | Worthen | .................. | B60R 1/00 |
| 2018/0290627 A1 * | 10/2018 | Hariri | ................... | B60R 25/245 |
| 2018/0308293 A1 * | 10/2018 | DeCia | .................... | G07C 5/008 |
| 2018/0345887 A1 * | 12/2018 | Brombach | ............ | B60R 16/033 |

FOREIGN PATENT DOCUMENTS

| | | |
|---|---|---|
| FR | 2929884 A3 | 10/2009 |
| FR | 2965219 A3 | 3/2012 |
| WO | 2018237319 A1 | 12/2018 |

OTHER PUBLICATIONS

BMW USA: "BMW i3 Front Storage Compartment Under the Hood: Genius How-To" Oct. 2, 2016 (Oct. 2, 2016), 1 page, XP054979265, Retrieved from Internet: URL: https://www.youtube.com/watch?v=ASVb-aUGQC/g; [retrieved on Feb. 3, 2019].
CN First Office Action counterpart CN Patent Application No. 201820257654.6 (Aug. 16, 2018) 3 pp [Redacted Partial English Translation Attached].
PCT International Written Opinion Counterpart Application No. PCT/US2018/088056 (dated Dec. 28, 2018); 7 pp.
PCT International Search Report No. PCT/US2018/068056 (dated Dec. 28, 2018); 4 pp.

* cited by examiner

HVAC UNIT PLACEMENT CONFIGURATION FOR A VEHICLE

FIELD

Embodiments of the invention are in the field of electric vehicles. More particularly, embodiments of the invention relate to a heating, ventilation, and air-conditioning (HVAC) unit placement configuration for a vehicle.

BACKGROUND

Gas-powered vehicles are slowly being replaced by vehicles that are partially or wholly electrically powered. Typically gas-powered vehicles have an internal combustion engine (ICE), a firewall, and a bulky HVAC unit in the front of the vehicle. An HVAC unit typically includes a heater core, fans, controls, and bulky air flow ducts. A bulky HVAC unit typically is situated in the interior of the vehicle with many of the HVAC unit components under the dashboard. This results in a dashboard that extends into the interior of the passenger compartment of the vehicle taking room away from interior of the vehicle.

Additionally, having the HVAC unit inside the interior of the vehicle limits the design choices for a dashboard i.e., the dashboard needs to surround the necessary mechanical components of the HVAC unit.

SUMMARY

Embodiments and examples are disclosed for placement configurations of HVAC units for electric vehicles. For one embodiment, a vehicle includes a front compartment, a cabin compartment, a vehicle body, and a HVAC unit. The front compartment is at a front end of the vehicle. The cabin compartment is situated near a center of the vehicle to house a user. The body of the vehicle contains a dashwall separating the front compartment from the cabin compartment. The heating, ventilation, and air-conditioning (HVAC) unit is situated in the front compartment separated from the user by a dashwall.

BRIEF DESCRIPTION OF THE DRAWINGS

The appended drawings illustrate examples and are, therefore, exemplary embodiments and not considered to be limiting in scope.

DETAILED DESCRIPTION

Embodiments and examples are disclosed for placement configuration of an HVAC unit for electric vehicles. The HVAC unit resides in the front of the vehicle on the other side of the dashwall separated from a user. Thus, the HVAC unit is near the front trunk and not in the interior of the vehicle. The placement of the HVAC unit near the front trunk frees up space in the passenger or cabin compartment of the vehicle. The placement of the HVAC unit near the front trunk also permits more variation in dashboard designs.

Figure 1:
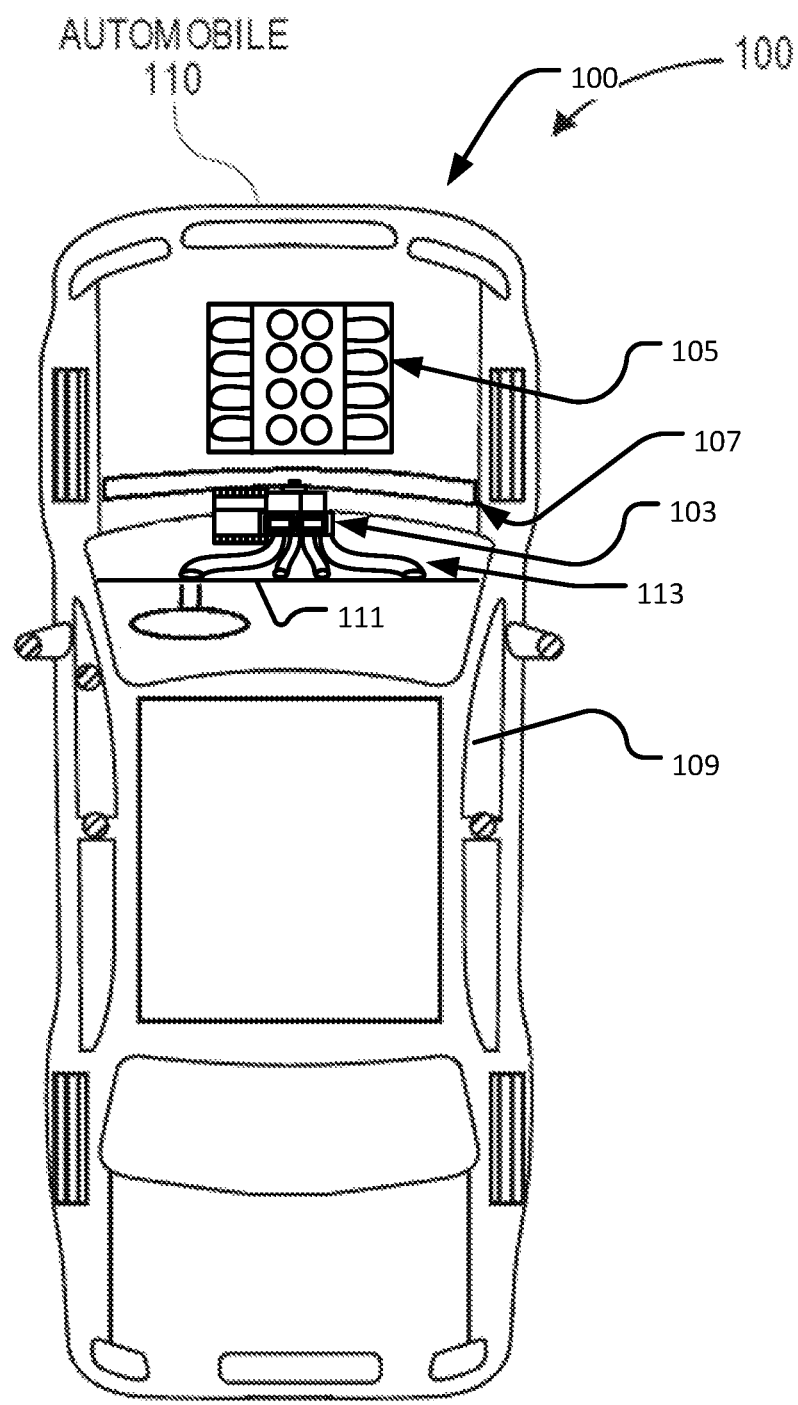
FIG. 1 illustrates a top view of a conventional gas-powered vehicle.

FIG. 1 illustrates a top view of a conventional gas-powered vehicle. Referring to FIG. 1, vehicle 100 includes HVAC unit 103, internal combustion engine (ICE) or gas powered engine 105, firewall 107, and dashboard 111. HVAC unit 103 can provide comfort to a user (not shown) housed in cabin compartment 109 of vehicle 100. For example, HVAC unit 103 can heat/cool/dehumidify and circulate air (via ventilation passages 113) into cabin compartment 109. HVAC unit 103 is situated in an interior of the vehicle below dashboard 111 (e.g., on the passenger compartment 109 side of the firewall 107). Dashboard 111 includes control panels located directly ahead of a driver or user of the vehicle. The control panels can display instrumentation and controls for the vehicle's operations.

ICE 105 provides a motive force to move vehicle 100. ICE 105 can be potentially hazardous because it can emit carbon monoxide, reach a high temperature, and catch fire when in operation. To reduce potential hazards to a driver of the vehicle, firewall 107 is situated in-between ICE 105 and dashboard 111 (and HVAC unit 103), separating ICE 105 and its potential hazards from a driver or user of the vehicle.

Figure 2:
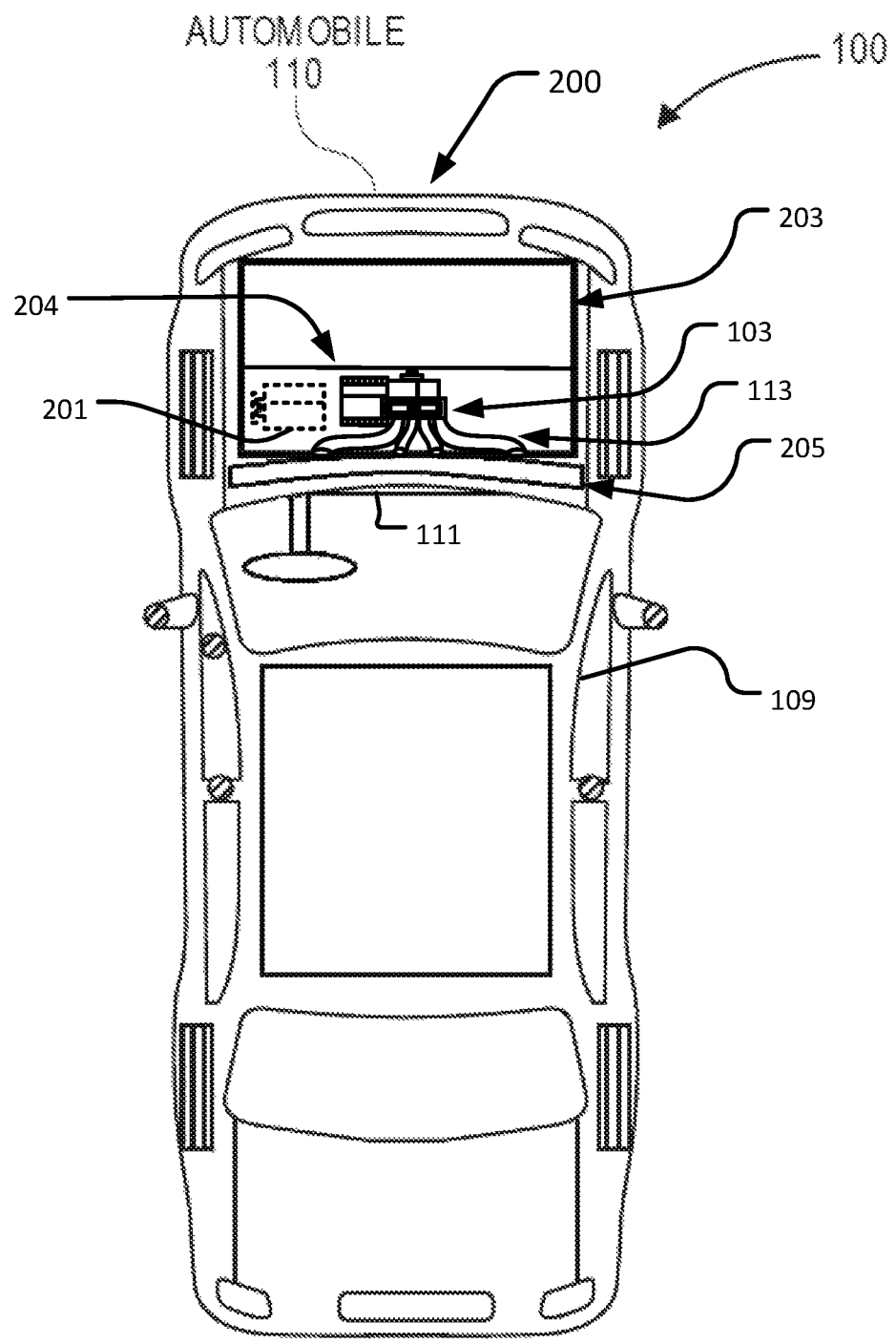
FIG. 2 illustrates a top view of an electric vehicle according to one embodiment.

FIG. 2 illustrates a top view of an electric vehicle according to one embodiment. Referring to FIG. 2, for one embodiment, vehicle 200 is a front wheel drive sedan electric vehicle with electric motor 201 in a front portion of vehicle 200. Vehicle 200 includes HVAC unit 103 (including ventilation passages 113), electric motor 201, front compartment or front trunk 203, dashwall 205 (dashwall is called a firewall in prior art), and dashboard 111. Electric motor 201 can drive a drivetrain or directly a front wheel of vehicle 200 to mobilize vehicle 200. Because the front wheel drive electric vehicle has no ICE, extra space is available for a front trunk compartment 203, also referred to as frunk 203.

Dashwall 205 separates the front trunk compartment 203 from dashboard 111. Dashwall 205 can be a part of the vehicle body of vehicle 200, e.g., an integrated body part. For one embodiment, the front trunk compartment can house HVAC unit 103. For one embodiment, the front trunk compartment 203 includes a divider or panel 204 to separate a front trunk space for storage purposes and HVAC unit 103, such that panel 204 can allow a user to access the HVAC unit 103. Because the HVAC unit 103 is no longer housed in the interior compartment of the vehicle behind or underneath dashboard 111, dashboard 111 can have more variations in design. For example, dashboard 111 can be designed to be relatively close to dashwall 205 to provide more space for passengers of vehicle 200. Moreover, the dashboard 111 can have different shapes that are not dictated by the presence of an HVAC unit.

Figure 3:
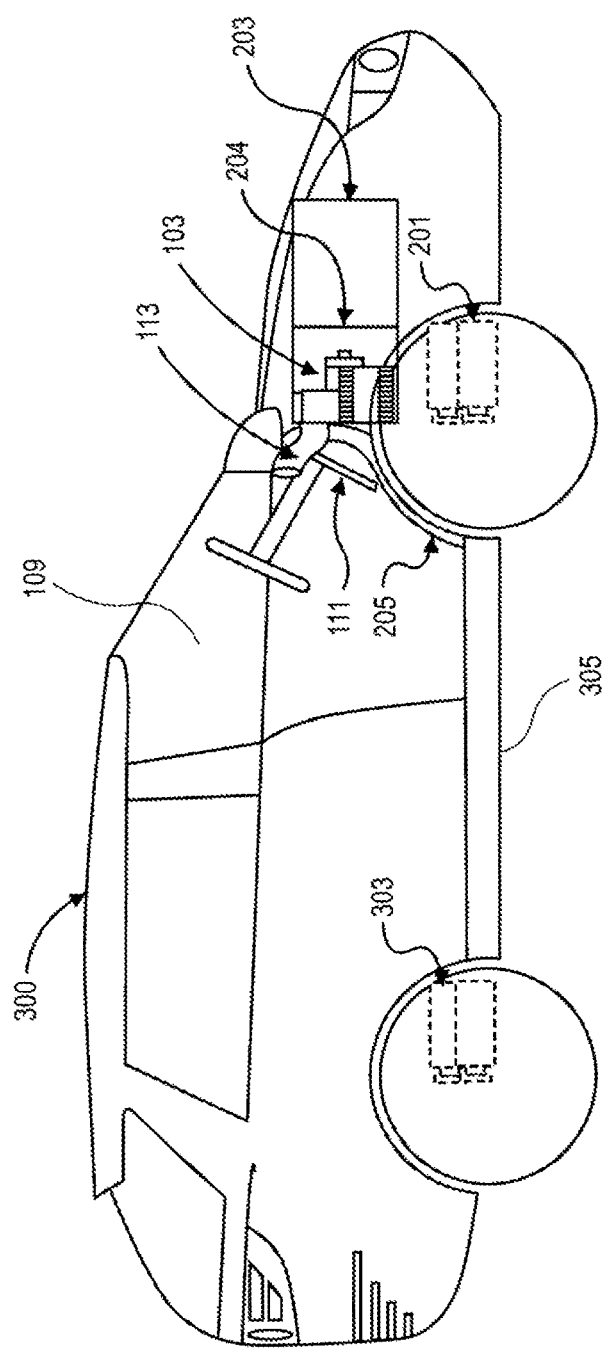
FIG. 3 illustrates a side view of an electric vehicle according to one embodiment.

FIG. 3 illustrates a side view of an electric vehicle according to one embodiment. Referring to FIG. 3, for one embodiment, vehicle 300 can be an all-wheel drive SUV electric vehicle. Vehicle 300 includes HVAC unit 103 (including ventilation passages 113), front trunk compartment 203, dashboard 111, dashwall 205 (dashwall is called a firewall in prior art), electric motors 201 and 303, and battery 305. HVAC unit 103 is placed in a front trunk compartment 203 of vehicle 300 separated from a front trunk storage space by panel 204. HVAC unit 103 includes ventilating passages 113 to circulate and direct air from HVAC unit 103 to cabin compartment 109, or vice versa. For one embodiment, dashwall 205 is an integral part of the vehicle body separating HVAC unit 103 from cabin compartment 109 such that the HVAC unit 103 is situated away from the cabin compartment of the vehicle in view of dashwall 205. Because HVAC unit 103 is no longer housed by, or within, dashboard 111, dashboard 111 can be designed to provide more space for passengers of the vehicle while retaining the same car frame size. In addition, dashboard 111 can include a more creative design because dashboard 111 no longer needs to cover an HVAC unit.

For one embodiment, battery 305 is placed in a floor compartment below the cabin compartment of the vehicle. Battery 305 provides energy to drive electric motors 201 and 303. Battery 305 can be any type of battery, e.g., lithium ion battery, chemical battery, fuel cell, or a combination thereof. Electric motors 201 and 303 can be housed near a front and a rear portion of vehicle 300 respectively, for example, electric motor 201 can be housed near the front wheels to drive the front wheels of vehicle 300 and electric motor 303 can be housed near the rear wheels to drive the rear wheels of vehicle 300.

In the foregoing specification, the invention has been described with reference to specific exemplary embodiments thereof. It will, however, be evident that various modifications and changes may be made thereto without departing from the broader spirit and scope of disclosed examples and embodiments. The specification and drawings are, accordingly, to be regarded in an illustrative rather than a restrictive sense.

What is claimed is:

1. A vehicle, the vehicle comprising:
a front compartment at a front end of the vehicle;
a cabin compartment to house a user;
a dashboard situated within the cabin compartment, the dashboard includes an instrumentation display for the user;
a vehicle body containing a dashwall separating the front compartment from the cabin compartment; and
a heat ventilation air conditioning (HVAC) unit situated in the front compartment separated from the cabin compartment by the dashwall, wherein the HVAC unit provides heat, ventilation, and air conditioning to the user in the cabin compartment, wherein the HVAC is separated from the dashboard by the dashwall.

2. The vehicle of claim 1, wherein the front compartment includes a front trunk.

3. The vehicle of claim 1, further comprising a rear compartment at a rear end of the vehicle housing an electric motor to drive the vehicle.

4. The vehicle of claim 3, further comprising a battery compartment below the cabin compartment to house a battery to energize the electric motor to drive the vehicle.

5. The vehicle of claim 1, wherein the HVAC unit provides heat, ventilation, and air conditioning to the user in the cabin compartment via one or more ventilating passages connecting the front compartment to the cabin compartment.

6. The vehicle of claim 1, wherein the vehicle is an electric vehicle.

7. The vehicle of claim 1, wherein the vehicle is an electric SUV vehicle.

8. The vehicle of claim 1, wherein the dashwall is not protruding into a portion of the cabin compartment so that the dashboard no longer covers a portion of the HVAC unit.

9. The vehicle of claim 2, wherein the front compartment includes a divider panel to separate the front trunk and the HVAC unit and the divider panel allows a user to access the HVAC unit.

10. The vehicle of claim 1, wherein the HVAC unit is not situated in a housing behind or underneath the dashboard.

11. The vehicle of claim 1, wherein the dashboard is situated within a predetermined distance to the dashwall to provide more space for passengers of the vehicle.

* * * * *